US009525847B2

(12) United States Patent
Yang et al.

(10) Patent No.: US 9,525,847 B2
(45) Date of Patent: Dec. 20, 2016

(54) MEDIA NEGOTIATION METHOD, DEVICE, AND SYSTEM FOR MULTI-STREAM CONFERENCE

(71) Applicant: Huawei Technologies Co., Ltd., Shenzhen, Guangdong (CN)

(72) Inventors: Weiwei Yang, Xi'an (CN); Haitao Wei, Shenzhen (CN); Jungang Ren, Shenzhen (CN); Jing Xiao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 112 days.

(21) Appl. No.: 14/640,210

(22) Filed: Mar. 6, 2015

(65) Prior Publication Data

US 2015/0181164 A1  Jun. 25, 2015

Related U.S. Application Data

(63) Continuation of application No. PCT/CN2013/077758, filed on Jun. 24, 2013.

(30) Foreign Application Priority Data

Sep. 7, 2012 (CN) .......................... 2012 1 0330102

(51) Int. Cl.
*H04N 7/14* (2006.01)
*H04N 7/15* (2006.01)
(Continued)

(52) U.S. Cl.
CPC ............ *H04N 7/15* (2013.01); *H04L 65/1006* (2013.01); *H04L 65/1069* (2013.01); *H04L 65/403* (2013.01); *H04M 3/567* (2013.01)

(58) Field of Classification Search
CPC ............. H04L 12/1827; H04L 65/1006; H04L 65/4038; H04L 67/24; H04L 67/303; H04L 67/306; H04L 65/069; H04L 65/403; H04L 65/605; H04L 65/4076; H04N 7/147; H04N 7/15; H04N 13/0059; H04N 12/23608; H04N 21/2365; H04N 21/2389; H04N 21/25808; H04N 21/42203
(Continued)

(56) References Cited

U.S. PATENT DOCUMENTS 7,848,956 B1 * 12/2010 MacLean ............... G06Q 30/02
705/26.41
8,706,473 B2 * 4/2014 Chou .................... G06F 17/289
348/14.01
(Continued)

FOREIGN PATENT DOCUMENTS

CN  102282847 A  12/2011
CN  102843542 A  12/2012
(Continued)

OTHER PUBLICATIONS

J. Hautakorpi, et al., "The Session Description Protocol (SDP) Content Attribute", Network Working Group, Feb. 2007, 11 pages.
(Continued)

*Primary Examiner* — Binh Tieu

(57) ABSTRACT

The present invention provides a media negotiation method, device, and system for a multi-stream conference. The method includes: sending a media advertisement message that carries information about at least two media data objects; receiving a media selection message that carries information, about a media data object, selected by a second media entity; and determining a corresponding media data object according to the information, about the media data object, selected by the second media entity, and establishing a media transmission channel with the second media entity, so as to transmit the corresponding media data object to the
(Continued)

second media entity through the media transmission channel. In embodiments of the present invention, more media data streams can be represented, and the representation accuracy and the amount of information of the media data stream can be improved

24 Claims, 7 Drawing Sheets

(51) Int. Cl.
  *H04M 3/56* (2006.01)
  *H04L 29/06* (2006.01)
(58) Field of Classification Search
  USPC .................. 348/14.01, 14.03, 14.07, 14.08, 14.09, 348/14.13
  See application file for complete search history.

(56) References Cited

U.S. PATENT DOCUMENTS

| | | | |
|---|---|---|---|
| 9,344,475 B2* | 5/2016 | Ye | H04N 7/147 |
| 2007/0005795 A1* | 1/2007 | Gonzalez | G06F 17/30017 |
| | | | 709/232 |
| 2008/0162498 A1* | 7/2008 | Omoigui | G06F 17/3089 |
| 2008/0170563 A1* | 7/2008 | Zhu | H04L 29/06027 |
| | | | 370/352 |
| 2009/0164575 A1* | 6/2009 | Barbeau | H04L 65/4038 |
| | | | 709/204 |
| 2009/0204716 A1 | 8/2009 | Srinivasan et al. | |
| 2009/0210491 A1 | 8/2009 | Thakkar et al. | |
| 2010/0123770 A1 | 5/2010 | Friel et al. | |
| 2010/0149309 A1* | 6/2010 | Hagen | H04N 7/144 |
| | | | 348/14.12 |
| 2011/0032324 A1* | 2/2011 | George | G06F 1/3203 |
| | | | 348/14.12 |
| 2011/0261151 A1* | 10/2011 | Wang | H04L 12/1827 |
| | | | 348/14.09 |
| 2012/0078700 A1* | 3/2012 | Pugliese, III | G06Q 30/02 |
| | | | 705/14.25 |
| 2012/0327174 A1* | 12/2012 | Hines | H04N 7/147 |
| | | | 348/14.07 |
| 2013/0016174 A1* | 1/2013 | Wu | H04L 65/4038 |
| | | | 348/14.07 |
| 2013/0242037 A1* | 9/2013 | George | G06F 1/3203 |
| | | | 348/14.12 |
| 2015/0199084 A1* | 7/2015 | Velusamy | G06F 3/04842 |
| | | | 715/716 |

FOREIGN PATENT DOCUMENTS

| | | |
|---|---|---|
| EP | 2 334 068 A1 | 6/2011 |
| JP | 2009-165107 A | 7/2009 |
| JP | 2012-170069 A | 9/2012 |
| RU | 2010133523 A | 2/2012 |
| RU | 2010134765 A | 2/2012 |
| WO | WO 2010/068115 A1 | 6/2010 |
| WO | WO 2012/055335 A1 | 5/2012 |

OTHER PUBLICATIONS

M. Duckworth, Ed., et al., "Framework for Telepresence Multi-Streams", Feb. 10, 2014, 71 pages.
J. Rosenberg, "A Framework for Conferencing with the Session Initiation Protocol (SIP)", Network Working Group, Feb. 2006, 29 pages.
M. Westerlund, et al., "RTP Topologies", Network Working Group, Jan. 2008, 21 pages.
A. Romanow, et al., "Framework for Telepresence Multi-Streams", Clue WG, Jul. 2, 2012, 35 pages.
"H.TPS-AV: Capture area", Huawei Technologies, International Telecommunication Union, Telecommunication Standardization Sector, Nov. 9, 2011, 8 pages.

* cited by examiner

MEDIA NEGOTIATION METHOD, DEVICE, AND SYSTEM FOR MULTI-STREAM CONFERENCE

CROSS REFERENCE TO RELATED APPLICATION

This application is a continuation of International Application No. PCT/CN2013/077758, filed on Jun. 24, 2013, which claims priority to Chinese Patent Application No. 201210330102.0, filed on Sep. 7, 2012, both of which are hereby incorporated by reference in their entireties.

TECHNICAL FIELD

The present invention relates to network communications technologies, and in particular, to a media negotiation method, device, and system for a multi-stream conference.

BACKGROUND

With the development of the video conferencing field, user conference sites develop from displays with one camera, one active video, and one active image to displays with multiple cameras, multiple active videos, and multiple active images. These displays with multiple cameras, multiple active videos, and multiple active images in a same site are associated according to a physical or logical relationship. For example, site A is a three-screen site, site B is a two-screen site, and site C is a single-screen site. Camera-1 of site A can capture an image of a participant at location-1 in site A, and the image is displayed on screen-1 of site A, site B, or site C.

In order to implement media negotiation and selection in a conference, some roles are defined in an existing standard specification to identify different media data objects in the conference. These roles include: slides (slides), a speaker (speaker), a sign language (sign language, sl), a main device media stream (main), and an auxiliary device media stream (alt). In a conference establishment process, media stream negotiation and selection is completed according to the foregoing definition.

However, when the foregoing role-based definition manner is applied to a telepresence conference environment with multiple devices and multiple active videos, the number of supported media data streams is limited, and it is difficult to represent multiple media data streams in a multi-stream conference, which causes limitation. For example, the foregoing definition can only be used in a scenario with one media stream for main, one media stream for alt, and one media stream for slides, and it is difficult to distinguish media streams when the number of the media streams increases.

SUMMARY

In view of this, embodiments of the present invention provide a media negotiation method, device, and system for a multi-stream conference, so as to solve a problem caused by a role-based definition manner in the prior art.

A first aspect provides a media negotiation method for a multi-stream conference, including:

sending, by a first media entity, a media advertisement message to a second media entity, where the media advertisement message carries information about at least two media data objects, the information about the media data objects at least includes information about one real-time site picture, the information about the real-time site picture at least includes media view information, and the media data objects are media data streams that can be provided by the first media entity for the second media entity;

receiving, by the first media entity, a media selection message sent by the second media entity, where the media selection message carries information, about a media data object, selected by the second media entity, and the information, about the media data object, selected by the second media entity is selected by the second media entity from the information about the at least two media data objects; and determining, by the first media entity, a corresponding media data object according to the information, about the media data object, selected by the second media entity, and establishing a media transmission channel with the second media entity, so as to transmit the corresponding media data object to the second media entity through the media transmission channel.

With reference to the first aspect, in a first possible implementation manner, the media view information includes:

coordinate range information of the real-time site picture; or location content information of the real-time site picture; or region division information of the real-time site picture in a particular scenario.

With reference to the first aspect, in a second possible implementation manner, the information about the media data objects further at least includes information about a presentation of shared content in a conference, and the information about the presentation includes:

type information of the shared content.

With reference to the first aspect or the first or second possible implementation manner of the first aspect, in a third possible implementation manner, the information about the media data objects further includes at least one of the following:

language information;
role information;
priority information;
state variation information;
embedded text information;
supplementary description information;
telepresence identification information; and
coding and decoding format information.

With reference to the first aspect or the first or second possible implementation manner of the first aspect, in a fourth possible implementation manner, before the sending, by a first media entity, the media advertisement message to a second media entity, the method further includes:

receiving, by the first media entity, a media capability message sent by the second media entity, where the media capability message carries media capability information that can be parsed by the second media entity, so that the first media entity determines the information about the at least two media data objects according to the media capability information that can be parsed by the second media entity.

With reference to the first aspect or the first or second possible implementation manner of the first aspect, in a fifth possible implementation manner, the method further includes:

receiving, by the first media entity, a media advertisement message sent by the second media entity, where the media advertisement message sent by the second media entity is used to notify the first media entity of information about a media data object that can be provided by the second media entity; and sending, by the first media entity, a media selection message to the second media entity, so as to notify the second media entity of information, about a media data object, selected by the first media entity, where the information about the media data object selected by the first media entity is selected from the information about the media data object that can be provided by the second media entity, so that the second media entity transmits the media data object selected by the first media entity to the first media entity through the media transmission channel.

With reference to the first aspect or the first or second possible implementation manner of the first aspect, in a sixth possible implementation manner, the media advertisement message and/or the media selection message is carried by one or a combination of several of the Session Initiation Protocol (SIP), the Session Description Protocol (SDP), the controlling multiple streams for telepresence (CLUE), and the H.323 series protocols; or, the information about the media data objects is carried in a text, binary, or extensible markup language (XML) format.

A second aspect provides a media negotiation method for a multi-stream conference, including:

receiving, by a second media entity, a media advertisement message sent by a first media entity, where the media advertisement message carries information about at least two media data objects, the information about the media data objects at least includes information about one real-time site picture, the information about the real-time site picture at least includes media view information, and the media data objects are media data streams that can be provided by the first media entity for the second media entity;

selecting, by the second media entity from the information about the at least two media data objects, information about a media data object;

sending, by the second media entity, a media selection message to the first media entity, where the media selection message carries the information, about the media data object, selected by the second media entity, so that the first media entity determines a corresponding media data object according to the information, about the media data object, selected by the second media entity; and establishing, by the second media entity, a media transmission channel with the first media entity, and receiving, through the media transmission channel, the corresponding media data object sent by the first media entity.

With reference to the second aspect, in a first possible implementation manner, the media view information includes:

coordinate range information of the real-time site picture; or location content information of the real-time site picture; or region division information of the real-time site picture in a particular scenario.

With reference to the second aspect, in a second possible implementation manner, the information about the media data objects further at least includes information about an presentation of shared content in a conference, and the information about the presentation includes:

type information of the shared content.

With reference to the second aspect or the first or second possible implementation manner of the second aspect, in a third possible implementation manner, the information about the media data objects further includes at least one of the following:

language information;
role information;
priority information;
state variation information;
embedded text information;
supplementary description information;
telepresence identification information; and
coding and decoding format information.

With reference to the second aspect or the first or second possible implementation manner of the second aspect, in a fourth possible implementation manner, before the receiving, by a second media entity, the media advertisement message sent by a first media entity, the method further includes:

sending, by the second media entity, a media capability message to the first media entity, where the media capability message carries media capability information that can be parsed by the second media entity, so that the first media entity determines the information about the at least two media data objects according to the media capability information that can be parsed by the second media entity.

A third aspect provides a media negotiation device for a multi-stream conference, where the device is a first media entity, and the device includes:

a first sending module, configured to send a media advertisement message to a second media entity, where the media advertisement message carries information about at least two media data objects, the information about the media data objects at least includes information about one real-time site picture, the information about the real-time site picture at least includes media view information, and the media data objects are media data streams that can be provided by the first media entity for the second media entity;

a first receiving module, configured to receive a media selection message sent by the second media entity, where the media selection message carries information, about a media data object, selected by the second media entity, and the information, about the media data object, selected by the second media entity is selected by the second media entity from the information about the at least two media data objects; and an establishment module, configured to determine a corresponding media data object according to the information, about the media data object, selected by the second media entity, and establish a media transmission channel with the second media entity, so as to transmit the corresponding media data object to the second media entity through the media transmission channel.

With reference to the third aspect, in a first possible implementation manner, the media view information carried in the media advertisement message sent by the first sending module includes:

coordinate range information of the real-time site picture; or location content information of the real-time site picture; or region division information of the real-time site picture in a particular scenario.

With reference to the third aspect, in a second possible implementation manner, the information, about the media data objects, carried in the media advertisement message sent by the first sending module further at least includes information about an presentation of shared content in a conference, and the information about the presentation includes:

type information of the shared content.

With reference to the third aspect or the first or second possible implementation manner of the third aspect, in a third possible implementation manner, the information, about the media data objects, carried in the media advertisement message sent by the first sending module further includes at least one of the following:
language information;
role information;
priority information;
state variation information;
embedded text information;
supplementary description information;
telepresence identification information; and
coding and decoding format information.

With reference to the third aspect or the first or second possible implementation manner of the third aspect, in a fourth possible implementation manner, the device further includes:
a third receiving module, configured to receive a media advertisement message sent by the second media entity, where the media advertisement message sent by the second media entity is used to notify the first media entity of information about a media data object that can be provided by the second media entity; and
a second sending module, configured to send a media selection message to the second media entity, so as to notify the second media entity of information, about a media data object, selected by the first media entity, where the information about the media data object selected by the first media entity is selected from the information about the media data object that can be provided by the second media entity, so that the second media entity transmits the media data object selected by the first media entity to the first media entity through the media transmission channel.

With reference to the third aspect or the first or second possible implementation manner of the third aspect, in a fifth possible implementation manner, the media advertisement message sent by the first sending module and/or the media selection message received by the first receiving module is carried by one or a combination of several of the Session Initiation Protocol (SIP), the Session Description Protocol (SDP), the controlling multiple streams for telepresence (CLUE), and the H.323 series protocols; or,
the information, about the media data objects, carried in the media advertisement message sent by the first sending module is carried in a text, binary, or extensible markup language (XML) format.

A fourth aspect provides a media negotiation device for a multi-stream conference, where the device is a second media entity, and the device includes:
a receiving module, configured to receive a media advertisement message sent by a first media entity, where the media advertisement message carries information about at least two media data objects, the information about the media data objects at least includes information about one real-time site picture, the information about the real-time site picture at least includes media view information, and the media data objects are media data streams that can be provided by the first media entity for the second media entity;
a selection module, configured to select, from the information about the at least two media data objects, information about a media data object;
a first sending module, configured to send a media selection message to the first media entity, where the media selection message carries the information, about the media data object, selected by the second media entity, so that the first media entity determines a corresponding media data object according to the information, about the media data object, selected by the second media entity; and
an establishment module, configured to establish a media transmission channel with the first media entity, and receive, through the media transmission channel, the corresponding media data object sent by the first media entity.

With reference to the fourth aspect, in a first possible implementation manner, the media view information carried in the media advertisement message received by the receiving module includes:
coordinate range information of the real-time site picture; or
location content information of the real-time site picture; or
region division information of the real-time site picture in a particular scenario.

With reference to the fourth aspect, in a second possible implementation manner, the information, about the media data objects, carried in the media advertisement message received by the receiving module further at least includes information about an presentation of shared content in a conference, and the information about the presentation includes:
type information of the shared content.

With reference to the fourth aspect or the first or second possible implementation manner of the fourth aspect, in a third possible implementation manner, the information, about the media data objects, carried in the media advertisement message received by the receiving module further includes at least one of the following:
language information;
role information;
priority information;
state variation information;
embedded text information;
supplementary description information;
telepresence identification information; and
coding and decoding format information.

With reference to the fourth aspect or the first or second possible implementation manner of the fourth aspect, in a fourth possible implementation manner, the device further includes:
a second sending module, configured to send a media capability message to the first media entity, where the media capability message carries media capability information that can be parsed by the second media entity, so that the first media entity determines the information about the at least two media data objects according to the media capability information that can be parsed by the second media entity.

A fifth aspect provides a media negotiation system for a multi-stream conference, including:
the device provided in the third aspect and the device provided in the fourth aspect.

According to the foregoing technical solutions, information sent by a media sender during media negotiation includes media view information, and a difference from the role information in the prior art lies in that, the media view information is content characteristic description of a media data object, and can better reflect an objective situation of the media data object. Different media data objects may be identified by using different media view information. Therefore, the media view information can be used to represent more media data streams, and can improve the representation accuracy and the amount of information of the media data streams.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
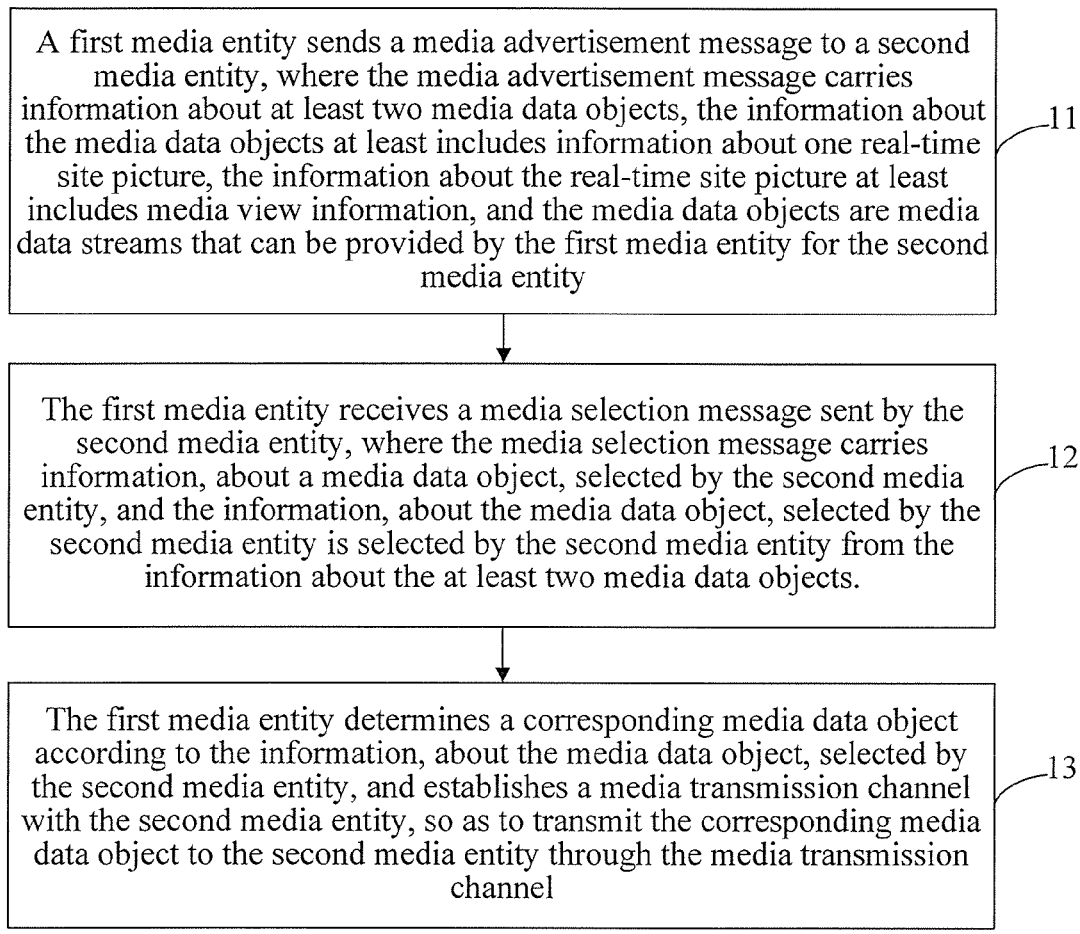
FIG. 1 is a schematic flowchart of an embodiment of a media negotiation method for a multi-stream conference according to the present invention.

Embodiments of the present invention may be applied to a multimedia conference system having a multi-stream transmit-receive capability, where the multimedia conference system includes a converged conference system based on an IP multimedia subsystem (Internet Protocol Multimedia Subsystem, IMS) architecture, and other IP-based multimedia conference systems. FIG. 1 is a schematic flowchart of an embodiment of a media negotiation method for a multi-stream conference according to the present invention, and the method includes:

Step 11: A first media entity sends a media advertisement message to a second media entity, where the media advertisement message carries information about at least two media data objects, the information about the media data objects at least includes information about one real-time site picture, the information about the real-time site picture at least includes media view information, and the media data objects are media data streams that can be provided by the first media entity for the second media entity.

Step 12: The first media entity receives a media selection message sent by the second media entity, where the media selection message carries information, about a media data object, selected by the second media entity, and the information, about the media data object, selected by the second media entity is selected by the second media entity from the information about the at least two media data objects.

Step 13: The first media entity determines a corresponding media data object according to the information, about the media data object, selected by the second media entity, and establishes a media transmission channel with the second media entity, so as to transmit the corresponding media data object to the second media entity through the media transmission channel.

Figure 2:
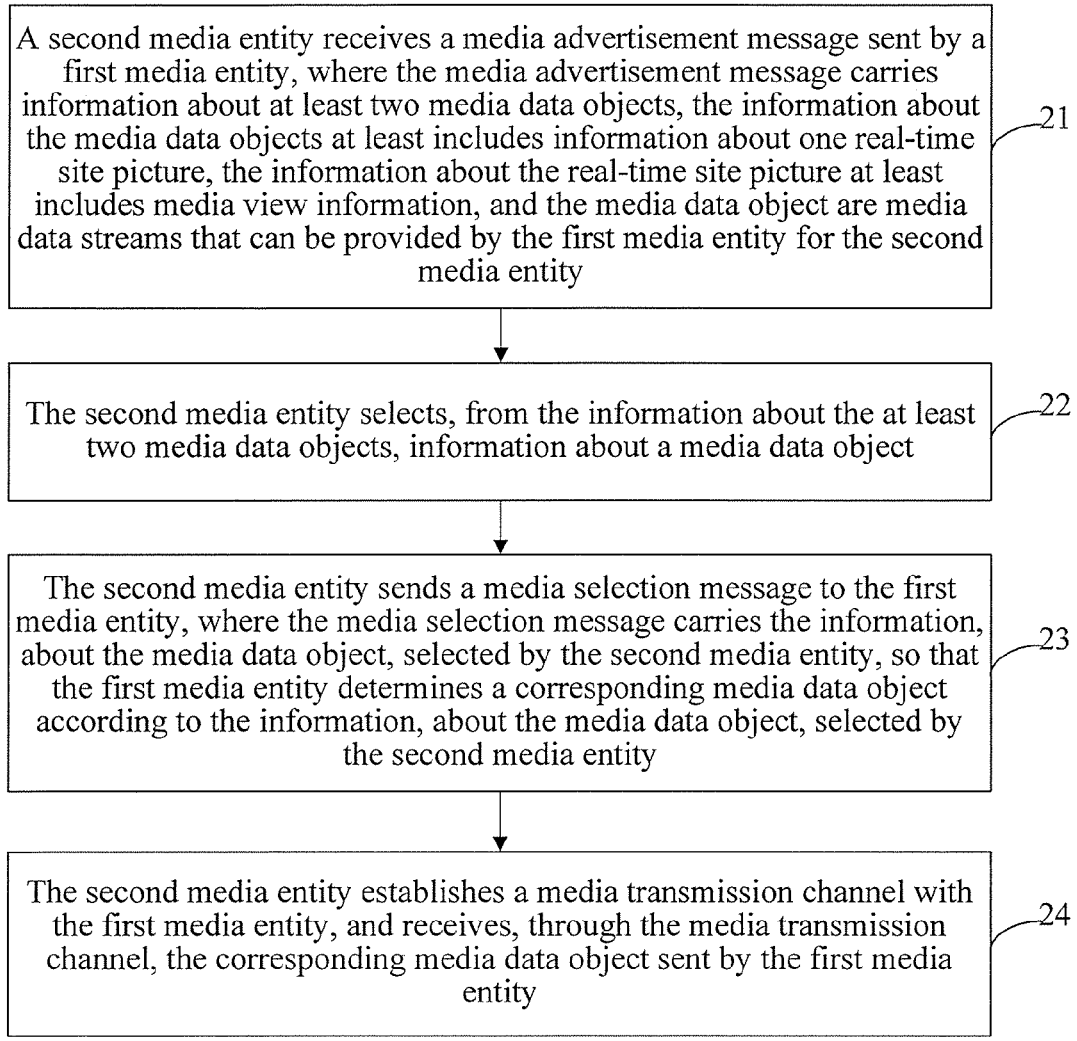
FIG. 2 is a schematic flowchart of another embodiment of a media negotiation method for a multi-stream conference according to the present invention.

Correspondingly, referring to FIG. 2, steps performed by a media receiver may include:

Step 21: A second media entity receives a media advertisement message sent by a first media entity, where the media advertisement message carries information about at least two media data objects, the information about the media data objects at least includes information about one real-time site picture, the information about the real-time site picture at least includes media view information, and the media data objects are media data streams that can be provided by the first media entity for the second media entity.

Step 22: The second media entity selects, from the information about the at least two media data objects, information about a media data object.

Step 23: The second media entity sends a media selection message to the first media entity, where the media selection message carries the information, about the media data object, selected by the second media entity, so that the first media entity determines a corresponding media data object according to the information, about the media data object, selected by the second media entity.

Step 24: The second media entity establishes a media transmission channel with the first media entity, and receives, through the media transmission channel, the corresponding media data object sent by the first media entity.

The first media entity and the second media entity in the foregoing embodiment may be two conference terminals in a point-to-point conference scenario, for example, two telepresence conference terminals in the point-to-point conference scenario. Alternatively, in a multipoint conference scenario, the first media entity and the second media entity may be each conference terminals and a multipoint control unit (MCU) used as a conference server, respectively.

In the embodiment of the present invention, a conference terminal may be specifically configured to encode and packetize video and audio data, then transmit the video and audio data to a remote terminal through a network, receive data transmitted from the remote terminal, and depacketize and decode the data, and the conference terminal is a device used for contact between a network and an end user to implement network application. The conference terminal may support high definition, standard definition, and software, or a hybrid participation mode of a mobile phone and a tablet computer; or, support a dedicated line, Internet, 3G access, and the like. A telepresence conference terminal may refer to a conference terminal that can support high definition, for example, support a 1080P high definition video.

Optionally, each media data stream corresponds to one media data object, and the media data object at least includes one real-time site picture. Further, the media data object may further include a presentation of shared content in a conference, that is, the media data object may be real-time content of a site in one aspect, or content shared between sites in another aspect.

Media view information of a real-time site picture may include:

coordinate range information of the real-time site picture; or location content information of the real-time site picture, where its value may be: a conference room, seats and participants, or an individual participant; or region division information of the real-time site picture in a particular scenario, where its value may be: a classroom and a lectern, or a teacher, and students and audience in an educational scenario.

Information about a media data object corresponding to the presentation of the shared content in the conference may include:

type information of the shared content, where its value may be: presentation slides, an presentation video, an presentation picture, or presentation data.

Optionally, the information about the media data objects may further include at least one of the following:

language information;

role information, where its value may be: a current speaker, a floor or a conference chairman;

priority information;

state variation information, where its value may be: dynamic, static, or frequently changed;

embedded text information;

supplementary description information;

telepresence identification information; and coding and decoding format information.

In this embodiment, information sent by a media sender during media negotiation includes media view information, and a difference from the role information in the prior art lies in that, the media view information is content characteristic description of a media data object, which can better reflect an objective situation of a media data stream. Different media data streams have different objective information, and may be identified by using different media view information. Therefore, the media view information can be used to represent more media data streams, and can improve the representation accuracy and the amount of information of the media data streams.

In the embodiment of the present invention, media negotiation may be performed to establish a session between sites by using the Session Initiation Protocol (SIP) and the Session Description Protocol (SDP). Therefore, the media advertisement message, the media selection message and the media capability message that are involved in the embodiment of the present invention may be carried by the SIP protocol or the SDP protocol. Likewise, the media advertisement message, the media selection message and the media capability message may also be carried and implemented by the H.323 series protocols formulated by the International Telecommunication Union (ITU) or the controlling multiple streams for telepresence (CLUE) formulated by the Internet Engineering Task Force (IETF), or a combination of the protocols listed in the above.

In addition, in the embodiment of the present invention, information about a media data object may be carried in a text format in the SDP protocol, or may be carried in a text, binary, or extensible markup language (XML) format according to selection of different relied protocol mechanisms.

Figure 3:
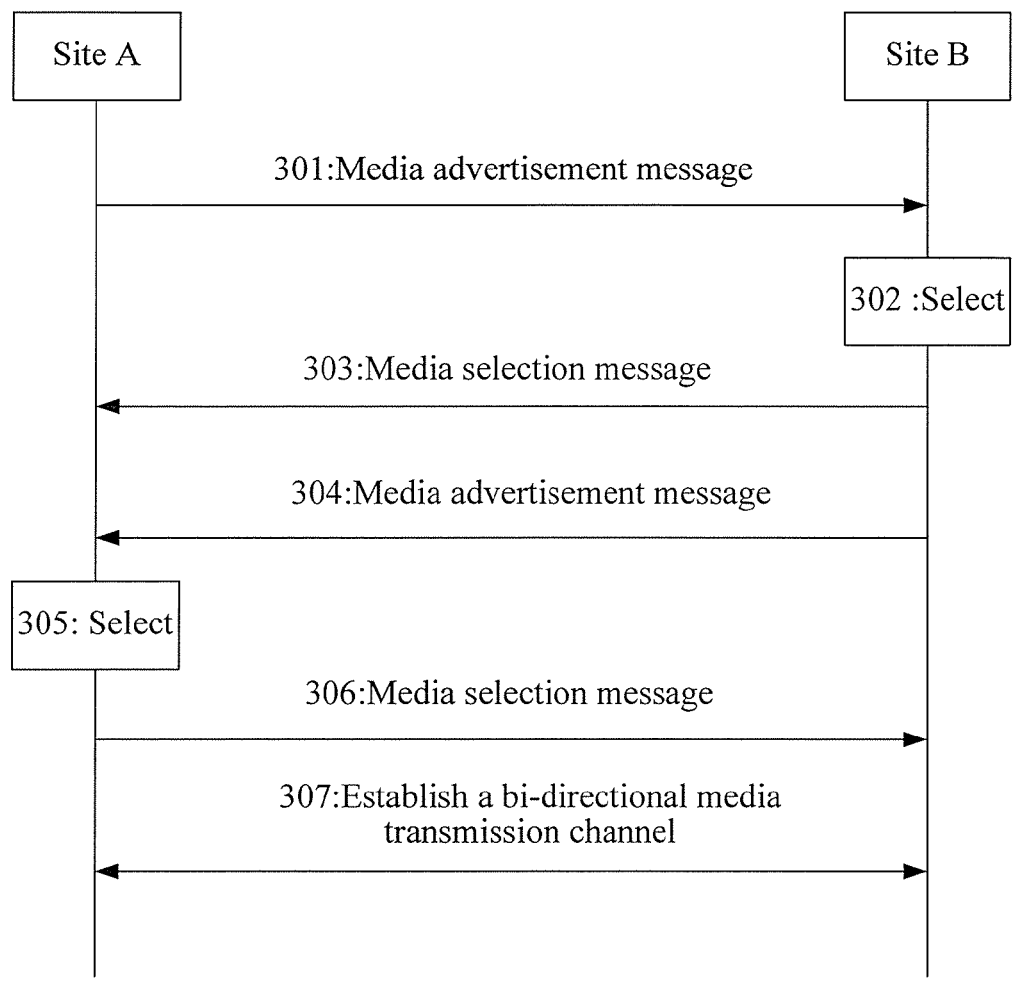
FIG. 3 is a schematic flowchart of another embodiment of a media negotiation method for a multi-stream conference according to the present invention.

FIG. 3 is a schematic flowchart of another embodiment of a media negotiation method for a multi-stream conference according to the present invention. In this embodiment, a remote conference system includes two sites, which are separately represented by site A and site B. Each site is a telepresence conference room having a display (screen) with at least three cameras and three active images, and can collect, send and receive, and display multiple media streams simultaneously. In the embodiment of the present invention, site A and site B may refer to a telepresence conference terminal of site A and a telepresence conference terminal of site B respectively, and the method specifically includes the following steps:

Step 301: Site A sends a media advertisement message to site B, where the media advertisement message carries information about at least two media data objects.

These media data objects are media data streams that can be provided by site A to site B, such as video pictures collected by different cameras, audio clips collected by a site microphone, or data materials output by a computer of the site.

At least one media data object in these media data objects is a real-time site picture, and information about the real-time site picture at least includes media view information, where the media view information is content characteristic description of the media data object, which represents that the media data object is real-time picture information of the site, for example, information about a real-time video picture of entire site A, where the real-time video picture is captured by a particular camera.

In the step, the media advertisement message of site A may include the following information, about the media data object, represented by using the SDP protocol (supplementary explanation content of the media data object is in the brackets):

m=video 52886 RTP/AVP 31 (a media object definition of an entire picture of a conference room);

a=rtpmap:31 H261/9000 (a coding and decoding format of the media);

a=view:room (a view of the media object/picture is the entire site);

m=video 52888 RTP/AVP 31 (a media object definition of a picture of left ⅓ of seats and participants in a conference room);

a=rtpmap:31 H261/9000;

a=view:table (a viewing angle of the picture is seats and participants);

m=video 52890 RTP/AVP 31 (a media object definition of a picture of middle ⅓ of seats and participants in a conference room);

a=rtpmap:31 H261/9000;

a=view:table (a viewing angle of the picture is seats and participants);

m=video 52892 RTP/AVP 31 (a media object definition of a picture of right ⅓ of seats and participants in a conference room);

a=rtpmap:31 H261/9000;

a=view:table (a viewing angle of the picture is seats and participants);

m=video 52894 RTP/AVP 31 (a media object definition of a dynamic picture of a speaker in a conference room);

a=rtpmap:31 H261/9000; and a=view:individual (a viewing angle of the picture is an individual participant).

Each piece of content in the line starting with "m=" represents information about a media data object, for example, the "m=video 52886 RTP/AVP 31" line represents a media data object whose content format is a video, and it may be known according to media view information in the subsequent "a=view:room" line that, the media data object includes an entire picture of the entire site; and the subsequent "m=video 52888 RTP/AVP 31", with reference to its media view information "a=view:table" line, represents that its included media data object is a picture of seats and participants in a conference room.

For the definition of the media view information, a media view is content characteristic description of the media data object, where its value may be obtained in the following manners:

1) The value is coordinate range information of content captured by the media data object, for example, a point in the site (for example, a central point of three cameras above a middle screen) is selected as a coordinate measurement reference point, to define coordinates of a region captured by a camera, which may be described by using the coordinates of four points at lower left, lower right, upper left, and upper right, for example: (−2011, 2850, 0), (−673, 3000, 0), (−2011, 2850, 757), (−673, 3000, 757).

2) The value is location content information corresponding to the media data object, which includes: a conference room (Room), seats and corresponding participants (Table), and an individual participant (Individual). Further, the value may also be region division in a particular scenario, which includes: a classroom (still using Room or Classroom), a lectern and a teacher (Lectern), and students and audience (Audience) in an educational scenario.

In this embodiment, the value of the media view information is the second case in the foregoing, that is, location information corresponding to the media data object. Certainly, during implementation, it may also be a combination of various manners, for example, both coordinate range information and location content information of the media data object are included.

Here, it may be understood that, the media data object and a physical camera device configured to capture different images are not only limited to a fixed one-to-one mapping. For example, a picture used to show the current speaker may be collected by different devices and constantly changed according to detection of voice activeness, or a same device may also collect different pictures in different zooming manners at different moments.

In the conference, the participant may also provide shared content data for other participants. Relative to the content of a real-time site picture, the shared content data is also referred to as a presentation. The presentation generally refers to signals of a computer connected to a video conference terminal in the site, and includes video clips, pictures, and audio clips on a computer, and slides and text data that are edited by using a tool such as Office in the computer. In view of different types of presentations, for a content characteristic information field defining a conference presentation, namely, presentation type information, its value may include: presentation slides (presentation.slides), an presentation video (presentation.video), an presentation picture (presentation.picture), presentation data (presentation.data), and the like. In this embodiment, examples of the presentation of the shared content that may be provided by site A for site B are as follows:

m=application 53550 UDP/BFCP (presentation 1 of site shared content);
a=presentation.slides (the presentation is slides);
m=application 53552 UDP/BFCP (presentation 2 of site shared content); and
a=presentation.video (the presentation is video clips).

The foregoing content represents that site A may provide two different presentations of the shared content for site B, where one is slides, and the other is video clips.

Further, each media data object may further include the following content characteristics:

Role information (Role): the role information represents a functional role that a participant corresponding to the media data object serves as in a conference, where its value may include a current speaker (Speaker), a floor (Floor), a conference chairman (Chairman), or other roles (Others). The examples are as follows:

m=video 52888 RTP/AVP 31 (a media object definition of a picture of left ⅓ of seats and participants in a conference room);
a=rtpmap:31 H261/9000;
a=view:table (a viewing angle of the picture is seats and participants);
a=role:chairman (a picture includes a chairman of a conference);
m=video 52894 RTP/AVP 31 (a media object definition of a dynamic picture of a speaker in a conference room);
a=rtpmap:31 H261/9000;
a=view:individual (a viewing angle of the picture is an individual participant); and
a=role:speaker (a picture includes a current speaker).

Priority information (Priority): the priority information represents priorities of different media data objects when multiple media data objects exist in a site. Values of the priorities may be assigned according to a relative format, for example, priority sequencing information, (media data object 3, media data object 2, and media data object 1), provided in the description of the entire site may successively represent priority levels of different media data objects. Likewise, the values of the priorities may also be assigned according to the granularities of the media data objects, that is, priority value information is added in the description of each media data object, and a corresponding priority may decrease with increases in its value from 1 to several, and priority values of different media data objects may be different or may be the same. The examples are as follows:

m=video 52886 RTP/AVP 31 (a media object definition of an entire picture of a conference room);
a=rtpmap:31 H261/9000 (a coding and decoding format of the media);
a=view:room (a view of the media object/picture is the entire site);
a=role:chairman (a picture includes a chairman of a conference);
a=priority:1 (a priority of a picture);
m=video 52888 RTP/AVP 31 (a media object definition of a picture of left ⅓ of seats and participants in a conference room);
a=rtpmap:31 H261/9000;
a=view:table (a viewing angle of the picture is seats and participants);
a=priority:3 (a priority of a picture);
m=video 52890 RTP/AVP 31 (a media object definition of a picture of middle ⅓ of seats and participants in a conference room);
a=rtpmap:31 H261/9000;
a=view:table (a viewing angle of the picture is seats and participants);
a=priority:2 (a priority of a picture);

m=video 52892 RTP/AVP 31 (a media object definition of a picture of right ⅓ of seats and participants in a conference room);
  a=rtpmap:31 H261/9000;
  a=view:table (a viewing angle of the picture is seats and participants);
  a=priority:3 (a priority of a picture);
m=video 52894 RTP/AVP 31 (a media object definition of a dynamic picture of a speaker in a conference room);
  a=rtpmap:31 H261/9000;
  a=view:individual (a viewing angle of the picture is an individual participant);
  a=role:speaker (a picture includes a current speaker); and
  a=priority:1 (a priority of a picture).

The foregoing priority information represents sequencing of different media data objects from the perspective of a media provider, may be used as reference when a media receiver selects a media data object, and may also be used as a policy making basis during shortage of media transmission resources or network congestion.

Further, each media data object may further include the following content characteristics:

language information (Language): the language information represents a language type related to the media data object, for example, a language used by audio in the media data object, or a language used by text information included in a video. The examples are as follows:
  m=video 52894 RTP/AVP 31 (a media object definition of a dynamic picture of a speaker in a conference room);
    a=rtpmap:31 H261/9000;
    a=view:individual (a viewing angle of the picture is an individual participant);
    a=role:speaker (a picture includes a current speaker);
    a=priority:1 (a priority of a picture);
    a=language: English;
  m=video 52896 RTP/AVP 31 (a media object definition of a dynamic picture of a speaker in a conference room);
    a=rtpmap:31 H261/9000;
    a=view:individual (a viewing angle of the picture is an individual participant);
    a=role:speaker (a picture includes a current speaker);
    a=priority:1 (a priority of a picture);
    a=language:Chinese;
  m=video 52898 RTP/AVP 31 (a media object definition of a dynamic picture of a speaker in a conference room);
    a=rtpmap:31 H261/9000;
    a=view:individual (a viewing angle of the picture is an individual participant);
    a=role:speaker (a picture includes a current speaker);
    a=priority:1 (a priority of a picture); and
    a=language:Arabic.

The foregoing descriptions represent that site A may provide the speaker with images in three different types of languages: English (English), Chinese (Chinese), and Arabic (Arabic) simultaneously.

State variation information (Variation): the state variation information represents a variation characteristic of a media view corresponding to a media data object, for example, a view of a site picture collected by a fixed camera without a zoom does not change in a conference, but a media view of a moving camera constantly changes as the device moves, and the latter device is commonly seen in a scenario of telemedicine and distance education. Therefore, during media negotiation, a media sender notifies a media receiver of state variation information (Variation) defined for a media data object. A value of the information may be defined according to a requirement and includes: static (Static), dynamic (Dynamic), changed frequently (Highly Dynamic), or the like.

The examples are as follows:
  m=video 52886 RTP/AVP 31 (a media object definition of an entire picture of a conference room);
    a=rtpmap:31 H261/9000 (a coding and decoding format of the media);
    a=view:room (a view of the media object/picture is the entire site);
    a=variation:static (a media view of the picture maintains unchanged);
  m=video 52894 RTP/AVP 31 (a media object definition of a dynamic picture of a speaker in a conference room);
    a=rtpmap:31 H261/9000;
    a=view:individual (a viewing angle of the picture is an individual participant); and
    a=variation:dynamic (a media view of the picture changes dynamically).

When state variation information of a media data object is dynamic (Dynamic) or changed frequently (Highly Dynamic), it means that a media view and spatial orientation information that correspond to the media data change constantly.

Embedded text information (Embedded Text): the embedded text information represents embedded text auxiliary information included in the media data object. In a conference, especially in a barrier-free site, different video pictures with embedded text explanation or text auxiliary information help a participant to participate in a conference more conveniently, and therefore, a site with a providing capability also provides a media data object that includes an embedded text. The examples are as follows:
  m=video 52886 RTP/AVP 31 (a media object definition of an entire picture of a conference room);
    a=rtpmap:31 H261/9000 (a coding and decoding format of the media);
    a=view:room (a view of the media object/picture is the entire site);
    a=textembedded:no (the picture does not include an embedded text);
  m=video 52894 RTP/AVP 31 (a media object definition of a dynamic picture of a speaker in a conference room);
    a=rtpmap:31 H261/9000;
    a=view:individual (a viewing angle of the picture is an individual participant); and
    a=textembedded:yes (the picture includes an embedded text).

Supplementary description information (Supplementary): in some particular conference scenarios, to ensure the effect of the conference, the site may provide auxiliary voice explanation or instant translation media simultaneously, but these persons who provide the explanation or translation are usually not in a main site environment. To distinguish the voice media from other real-time pictures, voice, or presentations of shared content in the site, attribute information of the supplementary description is defined. The examples are as follows:
  m=audio 55000 RTP/AVP 97 (a media object of audio in a site); and
  a=supplementary:translation (the media object is voice translation).

Telepresence identification information (Telepresence): in a telepresence conference scenario, besides basic audio and video media negotiation, there is also a corresponding requirement for auxiliary information in a site, such as lamplight and colors. To distinguish the telepresence site from other non-telepresence sites, it is necessary to identify a telepresence site. The examples are as follows:

m=video 52886 RTP/AVP 31 (a media object definition of an entire picture of a conference room);

a=rtpmap:31 H261/9000 (a coding and decoding format of the media); and a=telepresence:yes (the site is a telepresence site).

During implementation, the foregoing defined content characteristic information of media data is not required to be all carried, but is carried selectively according to an actual requirement. For example, the real-time site picture at least carries media view information, but other content characteristic information is optional; and the presentation of shared content generally carries a field of presentation type information.

Step 302: Site B receives and parses the information, about the at least two media data objects, carried in the media advertisement message sent by site A, and selects information about a media data object from the information about the at least two media data objects.

Site B may perform the foregoing selection according to the information, about the at least two media data objects, sent by site A, and a media data object that site B hopes to receive. For example, site B may perform selection according to an actual requirement, such as the number of screens in site B, media content characteristic information included in information about a media data stream sent by site A, and a media broadcast manner that participants in site B hope to watch. For example, if the number of screens of site B is three, site B can display three media data streams. In this case, site B can select three media data objects with high priorities in a descending order of the priorities according to the priorities in the media content characteristic information; or, site B can also perform selection according to a media view in the media content characteristic information, for example, selecting a media data stream in a middle location, or according to a role in the media content characteristic information, for example, selecting a media data stream of a speaker. A specific selection policy may be set by site B according to an actual requirement, so that the number of the selected media data streams does not exceed the number of the media data streams that can be displayed by site B.

Step 303: Site B sends a media selection message to site A, where the media selection message carries information, about a media data object, selected by site B.

The information, about the media data object, selected by site B is selected from the information, about the multiple media data objects, sent by site A, for example, the information, about the media data object, selected by site B may be represented as follows:

m=video 35886 RTP/AVP 31 (a media object definition of an entire picture of a conference room);

a=rtpmap:31 H261/9000 (a coding and decoding format of the media);

a=view:room (a view of the media object/picture is the entire site);

m=video 35894 RTP/AVP 31 (a media object definition of a dynamic picture of a speaker in a conference room);

a=rtpmap:31 H261/9000;

a=view:individual (a viewing angle of the picture is an individual participant);

m=application 35550 UDP/BFCP (presentation 1 of site shared content); and a=presentation.slides (the presentation is slides).

It can be known from the foregoing description that, site B selects an entire picture of a conference room of site A, a dynamic picture of a speaker in the conference room, and presentation_1 of shared content in the conference room.

In this embodiment, the media selection message of site B carries a result that site B performs selection on the media data object of site A, and an implementation manner thereof may include various flexible methods, for example, attribute line "a=" information with no change in the foregoing message may not be carried, and the examples are as follows:

m=video 35886 RTP/AVP 31 (a media object definition of an entire picture of a conference room);

m=video 35894 RTP/AVP 31 (a media object definition of a dynamic picture of a speaker in a conference room); and m=application 35550 UDP/BFCP (presentation 1 of site shared content).

In this way, the selection of the media data object by site B may be represented by using three media lines "m=".

Because the negotiation is bi-directional, the selection directed against site A by site B may be implemented by using the foregoing procedures. Similarly, site A may also perform selection on information, about multiple media data streams, sent by site B. That is, the method may further include:

Step 304: Site B sends a media advertisement message to site A, where the media advertisement message carries information about at least two media data objects, and the media data objects are media data streams that can be provided by site B for site A.

Step 305: Site A selects information, about a media data object, from the information, about the at least two media data streams, sent by site B.

Step 306: Site A sends media selection information to site B, where the media selection information carries information, about a media data object, selected by site A.

Specific content of steps 304 to 306 may be similar to that of steps 301 to 303.

In addition, steps 304 to 306 and steps 301 to 303 have no timing constraint relationship.

Step 307: Site A and site B establish a bi-directional media transmission channel according to a negotiation result.

For example, site A transmits a media data object selected by site B to site B, and then site B displays the media data object on a screen; or site B transmits a media data object selected by site A to site A, and then site A displays the media data object on a screen.

In addition, that one site transmits a media data object selected by another site may include: transmitting all selected media data objects, or transmitting some of the selected media data objects. For example, if site B selects 3 media data objects, site A may transmit the 3 media data objects to site B, or may select 2 from the 3 media data objects and transmit the 2 media data objects to site B.

In this embodiment, site A and site B separately announce to each other information about media data objects that can be provided by themselves. The announced information about the media data objects is identified by using media view information, which implements support for multiple media data streams, accurately distinguishes the multiple media data streams, and can provide more information, to avoid the limitations caused by an identification manner in the prior art.

Figure 4:
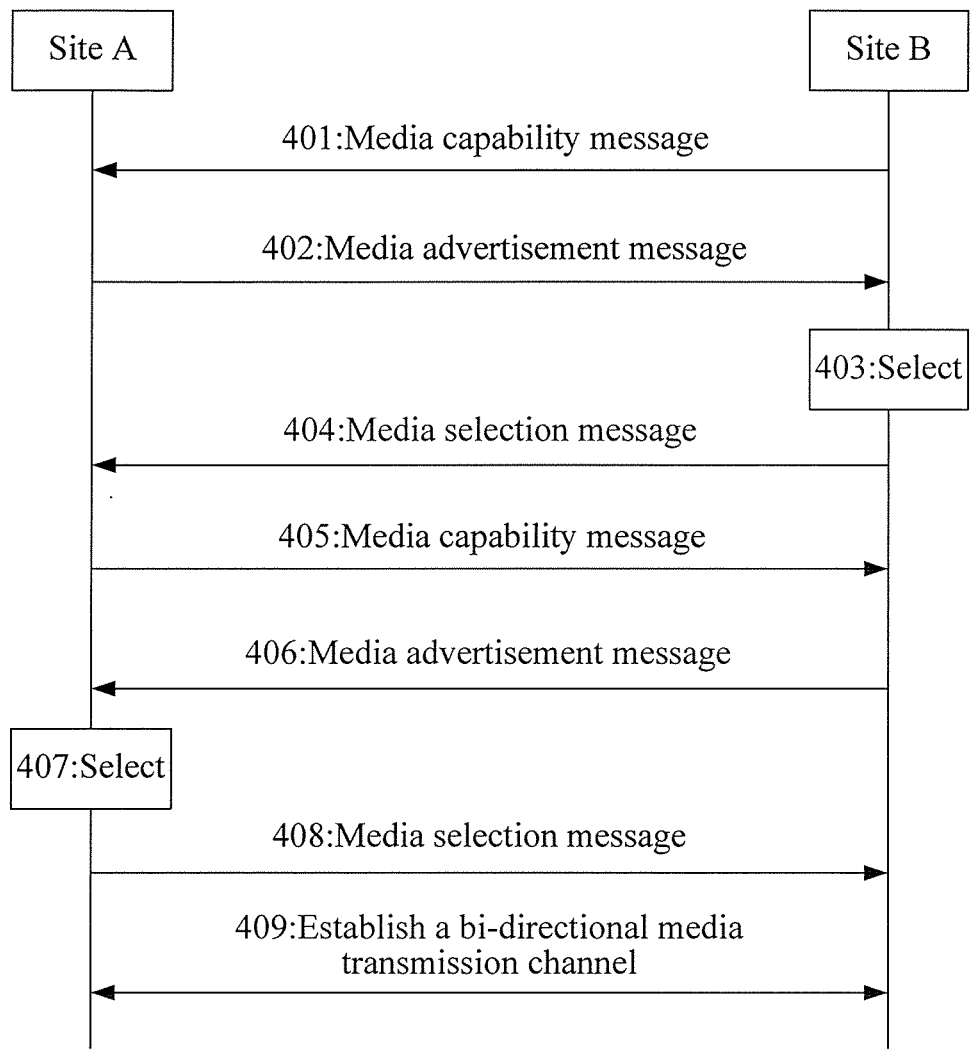
FIG. 4 is a schematic flowchart of another embodiment of a media negotiation method for a multi-stream conference according to the present invention.

FIG. 4 is a schematic flowchart of another embodiment of a media negotiation method for a multi-stream conference according to the present invention. A difference from the previous embodiment lies in that, a media advertisement message sent by a sender in this embodiment is sent according to a capability of a receiver. In this embodiment, site A and site B may refer to a telepresence conference terminal of site A and a telepresence conference terminal of site B respectively. The method of this embodiment includes:

Step 401: Site B sends a media capability message to site A, where the media capability message carries media capability information that can be parsed by site B.

For example, site B may simultaneously receive three pieces of video media with 1080p resolution and play the video media on three different screens, or site B hopes to play the video media on a certain screen in a picture in picture (Picture in Picture) format with one large picture and three small pictures. The media capability message helps site A that functions as a media sender to provide media content for site B in a more targeted manner.

Step 402: Site A sends a media advertisement message to site B according to the media capability information that can be parsed by site B, where the media advertisement message carries information about at least two media data objects, and the media data objects are determined by site A according to the media capability information that can be parsed by site B.

For example, if site B can parse three media data objects with 1080p resolution, site A may select at least three media data objects with 1080p resolution from media data objects that can be provided by site A, and then send corresponding information to site B; or when site B hopes to play picture in picture with one large picture and three small pictures on a certain screen, site A may combine media data objects that can be provided by site A, to obtain the picture in picture with one large picture and three small pictures, and then send information about the combined media data objects to site B.

Step 403: Site B selects information about a media data object from the information, about the at least two media data objects, sent by site A.

Step 404: Site B sends a media selection message to site A, where the media selection message carries the information, about the media data object, selected by site B.

Step 405: Site A sends a media capability message to site B.

Step 406: Site B sends a media advertisement message to site A.

Step 407: Site A selects information about a media data object from the information, about the at least two media data objects, sent by site B.

Step 408: Site A sends a media selection message to site B, where the media selection message carries the information, about the media data object, selected by site A.

Step 409: Site A and site B establish a bi-directional media transmission channel according to a negotiation result.

For specific content of steps 402 to 404, reference may be made to steps 301 to 303.

For specific content of steps 406 to 409, reference may be made to steps 304 to 307.

Steps 401 to 404 and steps 405 to 408 have no timing constraint relationship.

In this embodiment, site A and site B separately announce to each other information about media data objects that can be provided by themselves. The announced information about the media data objects is identified by using media view information, which implements support for multiple media data streams, accurately distinguishes the multiple media data streams, and can provide more information, to avoid the limitations caused by an identification manner in the prior art. In addition, a media requester of this embodiment performs media capability announcement according to a request of a media receiver, thereby improving the pertinence and reducing the transmission overhead. In the foregoing embodiment, each message is separately sent, and optionally, multiple messages may also be sent simultaneously, as shown in FIG. 5.

Figure 5:
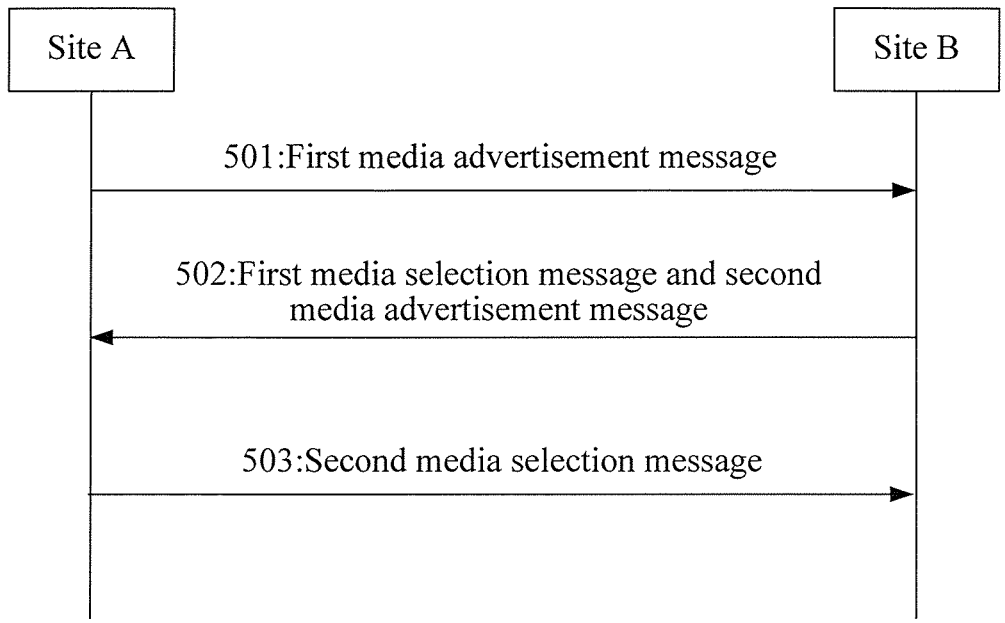
FIG. 5 is a schematic flowchart of another embodiment of a media negotiation method for a multi-stream conference according to the present invention.

FIG. 5 is a schematic flowchart of another embodiment of a media negotiation method for a multi-stream conference according to the present invention. In this embodiment, site A and site B may refer to a telepresence conference terminal of site A and a telepresence conference terminal of site B respectively. The method of this embodiment includes:

Step 501: Site A sends a first media advertisement message to site B.

Step 502: Site B sends a first media selection message and a second media advertisement message to site A.

Step 503: Site A sends a second media selection message to site B.

The foregoing first media advertisement message carries information about at least two first media data objects, where the first media data objects are media data streams that can be provided by site A for site B.

The foregoing first media selection message carries information, about a first media data object, selected by site B.

The foregoing second media advertisement message carries information about at least two second media data objects, where the second media data objects are media data streams that can be provided by site B for site A.

The foregoing second media selection message carries information, about a second media data object, selected by site A.

For information about the the foregoing media data objects, a selection manner, and a sending manner of each message, reference may be made to the foregoing each embodiment.

It may be understood that, FIG. 5 is merely an example, and the foregoing messages sent simultaneously may also be sent in other combination manners, for example, the media advertisement message and the media capability message are sent simultaneously, the media selection message and the media capability message are sent simultaneously, and the like.

The foregoing embodiment is a scenario in which a point-to-point conference is established between telepresence conference terminals of site A and site B, and in a multipoint conference, the foregoing procedure is also applicable to media negotiation and selection performed between each conference terminal and a MCU that functions as a conference server.

Figure 6:
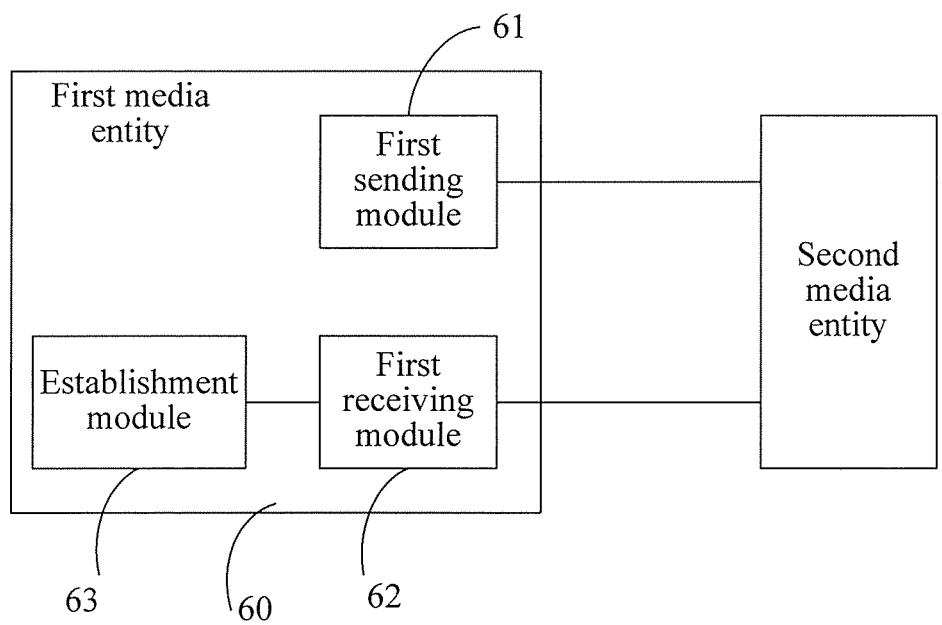
FIG. 6 is a schematic structural diagram of an embodiment of a media negotiation device for a multi-stream conference according to the present invention.

FIG. 6 is a schematic structural diagram of an embodiment of a media negotiation device for a multi-stream conference according to the present invention. The device may be a first media entity, and the device 60 includes a first sending module 61, a first receiving module 62, and an establishment module 63. The first sending module 61 is configured to send a media advertisement message to a second media entity, where the media advertisement message carries information about at least two media data objects, the information about the media data objects at least includes information about one real-time site picture, information about the real-time site picture at least includes media view information, and the media data objects are media data streams that can be provided by the first media entity for the second media entity. The first receiving module 62 is configured to receive a media selection message sent by the second media entity, where the media selection message carries information, about a media data object, selected by the second media entity, the information, about the media data object, selected by the second media entity is selected by the second media entity from the information about the at least two media data objects. The establishment module 63 is configured to determine a corresponding media data object according to the information, about the media data object, selected by the second media entity, and establish a media transmission channel with the second media entity, so as to transmit the corresponding media data object to the second media entity through the media transmission channel.

Optionally, the media view information carried in the media advertisement message sent by the first sending module includes:

coordinate range information of the real-time site picture; or location content information of the real-time site picture; or region division information of the real-time site picture in a particular scenario.

Optionally, the information, about the media data objects, carried in the media advertisement message sent by the first sending module further at least includes information about an presentation of shared content in a conference, and the information about the presentation includes:

type information of the shared content.

Optionally, the information, about the media data objects, carried in the media advertisement message sent by the first sending module further includes at least one of the following:

language information;
role information;
priority information;
state variation information;
embedded text information;
supplementary description information;
telepresence identification information; and
coding and decoding format information.

Optionally, the device further includes:

a second receiving module, configured to receive a media capability message sent by the second media entity, where the media capability message carries media capability information that can be parsed by the second media entity, so that the first media entity determines the information about the at least two media data objects according to the media capability information that can be parsed by the second media entity.

Optionally, the device further includes:

a third receiving module, configured to receive a media advertisement message sent by the second media entity, where the media advertisement message sent by the second media entity is used to notify the first media entity of information about a media data object that can be provided by the second media entity; and a second sending module, configured to send a media selection message to the second media entity, so as to notify the second media entity of information, about a media data object, selected by the first media entity, where the information about the media data object selected by the first media entity is selected from the information about the media data object that can be provided by the second media entity, so that the second media entity transmits the media data object selected by the first media entity to the first media entity through the media transmission channel.

Optionally, the media advertisement message sent by the first sending module and/or the media selection message received by the first receiving module is carried by one or a combination of several of the Session Initiation Protocol (SIP), the Session Description Protocol (SDP), the controlling multiple streams for telepresence (CLUE), and the H.323 series protocols; or, the information, about the media data objects, carried in the media advertisement message sent by the first sending module is carried in a text, binary, or extensible markup language (XML) format.

In this embodiment, information sent by a media sender during media negotiation includes media view information, and a difference from the role information in the prior art lies in that, the media view information is content characteristic description of a media data object, which can better reflect an objective situation of a media data stream. Different media data streams have different objective information, and may be identified by using different media view information. Therefore, the media view information can be used to represent more media data streams, and can improve the representation accuracy and the amount of information of the media data streams.

Figure 7:
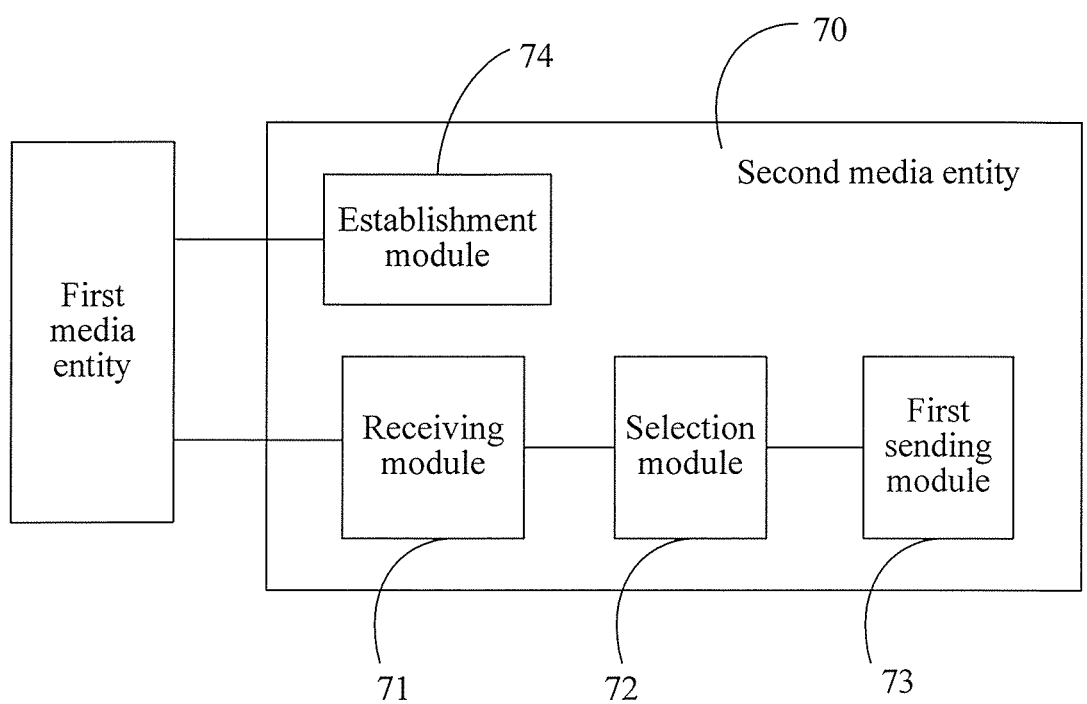
FIG. 7 is a schematic structural diagram of another embodiment of a media negotiation device for a multi-stream conference according to the present invention.

FIG. 7 is a schematic structural diagram of another embodiment of a media negotiation device for a multi-stream conference according to the present invention. The device may be a second media entity, and the device 70 includes a receiving module 71, a selection module 72, a first sending module 73, and an establishment module 74. The receiving module 71 is configured to receive a media advertisement message sent by a first media entity, where the media advertisement message carries information about at least two media data objects, the information about the media data objects at least includes information about one real-time site picture, the information about the real-time site picture at least includes media view information, and the media data objects are media data streams that can be provided by the first media entity for the second media entity. The selection module 72 is configured to select, from the information about the at least two media data objects, information about a media data object. The first sending module 73 is configured to send a media selection message to the first media entity, where the media selection message carries the information, about the media data object, selected by the second media entity, so that the first media entity determines a corresponding media data object according to the information, about the media data object, selected by the second media entity. The establishment module 74 is configured to establish a media transmission channel with the first media entity, and receive, through the media transmission channel, the corresponding media data object sent by the first media entity.

Optionally, the media view information carried in the media advertisement message received by the receiving Module includes:

coordinate range information of the real-time site picture; or location content information of the real-time site picture; or region division information of the real-time site picture in a particular scenario.

Optionally, the information, about the media data objects, carried in the media advertisement message received by the receiving module further at least includes information about an presentation of shared content in a conference, and the information about the presentation includes:

type information of the shared content.

Optionally, the information, about the media data objects, carried in the media advertisement message received by the receiving module further includes at least one of the following:

language information;
role information;
priority information;
state variation information;
embedded text information;
supplementary description information;
telepresence identification information; and
coding and decoding format information.

Optionally, the device further includes:

a second sending module, configured to send a media capability message to the first media entity, where the media capability message carries media capability information that can be parsed by the second media entity, so that the first media entity determines the information about the at least two media data objects according to the media capability information that can be parsed by the second media entity.

In this embodiment, information sent by a media sender during media negotiation includes media view information, and a difference from the role information in the prior art lies in that, the media view information is content characteristic description of a media data object, which can better reflect an objective situation of a media data stream. Different media data streams have different objective information, and may be identified by using different media view information. Therefore, the media view information can be used to represent more media data streams, and can improve the representation accuracy and the amount of information of the media data streams.

Figure 8:
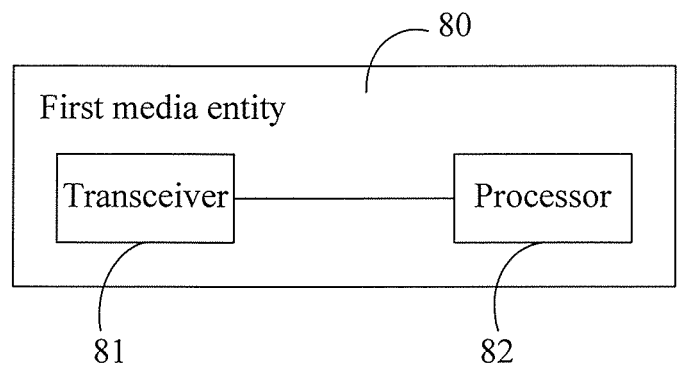
FIG. 8 is a schematic structural diagram of another embodiment of a media negotiation device for a multi-stream conference according to the present invention.

FIG. 8 is a schematic structural diagram of another embodiment of a media negotiation device for a multi-stream conference according to the present invention. The device may be a first media entity, and the device 80 includes a transceiver 81 and a processor 82.

The transceiver 81 is configured to send a media advertisement message to a second media entity, where the media advertisement message carries information about at least two media data objects, the information about the media data objects at least includes information about one real-time site picture, the information about the real-time site picture at least includes media view information, and the media data objects are media data streams that can be provided by the first media entity for the second media entity; and receive a media selection message sent by the second media entity, where the media selection message carries information, about a media data object, selected by the second media entity, and the information, about the media data object, selected by the second media entity is selected by the second media entity from the information about the at least two media data objects.

The processor 82 is configured to determine a corresponding media data object according to the information, about the media data object, selected by the second media entity, and establish a media transmission channel with the second media entity, so as to transmit the corresponding media data object to the second media entity through the media transmission channel.

Optionally, the media view information includes:
coordinate range information of the real-time site picture; or
location content information of the real-time site picture; or
region division information of the real-time site picture in a particular scenario.

Optionally, the information about the media data objects further at least includes information about an presentation of shared content in a conference, and the information about the presentation includes:
type information of the shared content.

Optionally, the information about the media data objects further includes at least one of the following:
language information;
role information;
priority information;
state variation information;
embedded text information;
supplementary description information;
telepresence identification information; and
coding and decoding format information.

Optionally, the transceiver is further configured to receive a media capability message sent by the second media entity, where the media capability message carries media capability information that can be parsed by the second media entity, so that the first media entity determines the information about the at least two media data objects according to the media capability information that can be parsed by the second media entity.

Optionally, the transceiver is further configured to receive a media advertisement message sent by the second media entity, where the media advertisement message sent by the second media entity is used to notify the first media entity of information about a media data object that can be provided by the second media entity; send a media selection message to the second media entity, so as to notify the second media entity of information, about a media data object, selected by the first media entity, where the information about the media data object selected by the first media entity is selected from the information about the media data object that can be provided by the second media entity, so that the second media entity transmits the media data object selected by the first media entity to the first media entity through the media transmission channel.

Optionally, the media advertisement message and/or the media selection message is carried by one or a combination of several of the Session Initiation Protocol (SIP), the Session Description Protocol (SDP), the controlling multiple streams for telepresence (CLUE), and the H.323 series protocols; or, the information about the media data objects is carried in a text, binary, or extensible markup language (XML) format.

The device may specifically perform steps of the method at the foregoing first media entity side, and the steps of the methods disclosed with reference to the embodiments of the present invention may be directly embodied as being implemented by a hardware component, or implemented by using a combination of hardware and software modules. The software module may be located in a mature storage medium in the art, such as a random access memory, a flash memory, a read-only memory, a programmable read-only memory or an electrically erasable programmable memory, or a register.

The foregoing processor may be a general processor, a digital signal processor (DSP), an application specific integrated circuit (ASIC), a field programmable gate array (FPGA), or another programmable logic component, discrete gate or transistor logic component and discrete hardware component. The general processor may be a microprocessor or any conventional processor.

The foregoing transceiver may receive and transmit a radio signal by using one or more antennas. The transceiver may be formed by a discrete transmitter and a discrete receiver, or may be a component that is coupled and has a receiving and transmitting function.

In this embodiment, information sent by a media sender during media negotiation includes media view information, and a difference from the role information in the prior art lies in that, the media view information is content characteristic description of a media data object, which can better reflect an objective situation of a media data stream. Different media data streams have different objective information, and may be identified by using different media view information. Therefore, the media view information can be used to represent more media data streams, and can improve the representation accuracy and the amount of information of the media data streams.

Figure 9:
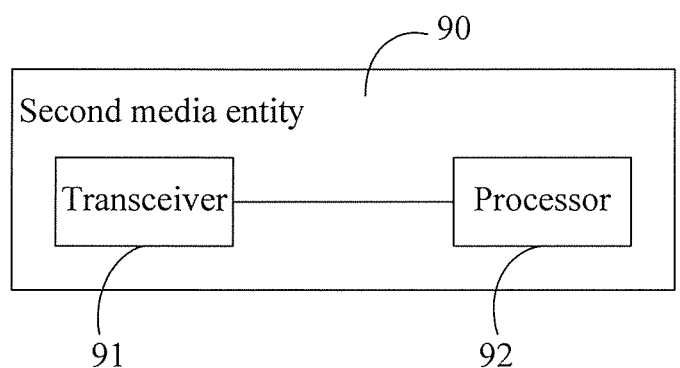
FIG. 9 is a schematic structural diagram of another embodiment of a media negotiation device for a multi-stream conference according to the present invention.

FIG. 9 is a schematic structural diagram of another embodiment of a media negotiation device for a multi-stream conference according to the present invention. The device may be a second media entity, and the device 90 includes a transceiver 91 and a processor 92.

The transceiver 91 is configured to receive a media advertisement message sent by a first media entity, where the media advertisement message carries information about at least two media data objects, the information about the media data objects at least includes information about one real-time site picture, the information about the real-time site picture at least includes media view information, and the media data objects are media data streams that can be provided by the first media entity for the second media entity; select, from the information about the at least two media data objects, information about a media data object; send a media selection message to the first media entity, where the media selection message carries the information, about the media data object, selected by the second media entity, so that the first media entity determines a corresponding media data object according to the information, about the media data object, selected by the second media entity; and establish a media transmission channel with the first media entity, and receiving, through the media transmission channel, the corresponding media data object sent by the first media entity.

The processor 92 is configured to select, from the information about the at least two media data objects, the information, about the media data object, selected by the second media entity.

Optionally, the media view information includes:
coordinate range information of the real-time site picture; or
location content information of the real-time site picture; or
region division information of the real-time site picture in a particular scenario.

Optionally, the information about the media data objects further at least includes information about an presentation of shared content in a conference, and the information about the presentation includes:
type information of the shared content.

Optionally, the information about the media data objects further includes at least one of the following:
language information;
role information;
priority information;
state variation information;
embedded text information;
supplementary description information;
telepresence identification information; and
coding and decoding format information.

Optionally, the transceiver is further configured to send a media capability message to the first media entity, where the media capability message carries media capability information that can be parsed by the second media entity, so that the first media entity determines the information about the at least two media data objects according to the media capability information that can be parsed by the second media entity. The device may specifically perform steps of the method at the foregoing second media entity side, and the steps of the methods disclosed with reference to the embodiments of the present invention may be directly embodied as being implemented by a hardware component, or implemented by using a combination of hardware and software modules. The software module may be located in a mature storage medium in the art, such as a random access memory, a flash memory, a read-only memory, a programmable read-only memory or an electrically erasable programmable memory, or a register.

The foregoing processor may be a general processor, a digital signal processor (DSP), an application specific integrated circuit (ASIC), a field programmable gate array (FPGA), or another programmable logic component, discrete gate or transistor logic component and discrete hardware component. The general processor may be a microprocessor or any conventional processor.

The foregoing transceiver may receive and transmit a radio signal by using one or more antennas. The transceiver may be formed by a discrete transmitter and a discrete receiver, or may be a component that is coupled and has a receiving and transmitting function.

In this embodiment, information sent by a media sender during media negotiation includes media view information, and a difference from the role information in the prior art lies in that, the media view information is content characteristic description of a media data object, which can better reflect an objective situation of a media data stream. Different media data streams have different objective information, and may be identified by using different media view information. Therefore, the media view information can be used to represent more media data streams, and can improve the representation accuracy and the amount of information of the media data streams.

Figure 10:
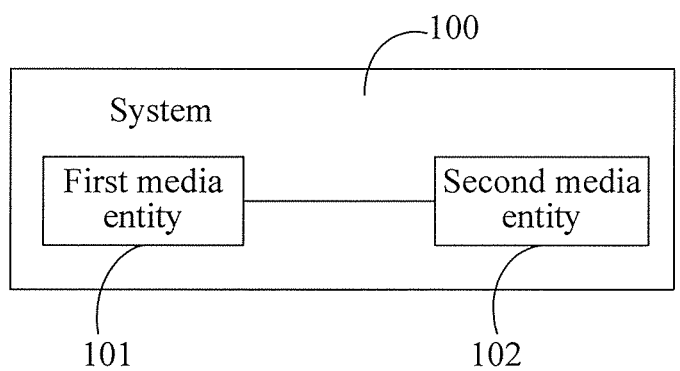
FIG. 10 is a schematic structural diagram of an embodiment of a media negotiation system for a multi-stream conference according to the present invention.

FIG. 10 is a schematic structural diagram of an embodiment of a media negotiation system for a multi-stream conference according to the present invention. The system 100 includes a first media entity 101 and a second media entity 102. For the first media entity 101 and the second media entity 102, reference may be separately made to the embodiment shown in FIG. 6 or FIG. 7, or, for the first media entity 101 and the second media entity 102, reference may be separately made to the embodiment shown in FIG. 8 or FIG. 9.

In this embodiment, information sent by a media sender during media negotiation includes media view information, and a difference from the role information in the prior art lies in that, the media view information is content characteristic description of a media data object, which can better reflect an objective situation of a media data stream. Different media data streams have different objective information, and may be identified by using different media view information. Therefore, the media view information can be used to represent more media data streams, and can improve the representation accuracy and the amount of information of the media data streams.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, rather than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, as long as such modifications or replacements do not cause the essence of corresponding technical solutions to depart from the scope of the technical solutions of the embodiments of the present invention.

What is claimed is:

1. A media negotiation method for a multi-stream conference, the method comprising:
    sending, by a first media entity, a media advertisement message to a second media entity, wherein the media advertisement message carries information about at least two media data objects, the information about the media data objects at least comprises information about one real-time site picture, the information about the real-time site picture at least comprises media view information, and the media data objects are media data streams that are provided by the first media entity for the second media entity;
    receiving, by the first media entity, a media selection message sent by the second media entity, wherein the media selection message carries information, about a media data object, selected by the second media entity, and the information, about the media data object, selected by the second media entity is selected by the second media entity from the information about the at least two media data objects; and
    determining, by the first media entity, a corresponding media data object according to the information, about the media data object, selected by the second media entity, and establishing a media transmission channel with the second media entity, so as to transmit the corresponding media data object to the second media entity through the media transmission channel.

2. The method according to claim 1, wherein the media view information comprises:
    coordinate range information of the real-time site picture; or
    location content information of the real-time site picture; or
    region division information of the real-time site picture in a particular scenario.

3. The method according to claim 1, wherein the information about the media data objects further comprises information about a presentation of shared content in a conference, and the information about the presentation comprises:
    type information of the shared content.

4. The method according to claim 1, wherein the information about the media data objects further comprises at least one of the following:
    language information;
    role information;
    priority information;
    state variation information;
    embedded text information;
    supplementary description information;
    telepresence identification information; and
    coding and decoding format information.

5. The method according to claim 1, wherein before sending, by a first media entity, the media advertisement message to the second media entity, the method further comprises:
    receiving, by the first media entity, a media capability message sent by the second media entity, wherein the media capability message carries media capability information that can be parsed by the second media entity, so that the first media entity determines the information about the at least two media data objects according to the media capability information that can be parsed by the second media entity.

6. The method according to claim 1, further comprising:
    receiving, by the first media entity, a media advertisement message sent by the second media entity, wherein the media advertisement message sent by the second media entity is used to notify the first media entity of information about a media data object that can be provided by the second media entity; and
    sending, by the first media entity, a media selection message to the second media entity, so as to notify the second media entity of information, about a media data object, selected by the first media entity, wherein the information about the media data object selected by the first media entity is selected from the information about the media data object that can be provided by the second media entity, so that the second media entity transmits the media data object selected by the first media entity to the first media entity through the media transmission channel.

7. The method according to claim 1, wherein:
    the media advertisement message and/or the media selection message is carried by one or a combination of several of the Session Initiation Protocol (SIP), the Session Description Protocol (SDP), the controlling multiple streams for telepresence (CLUE), and the H.323series protocols; or
    the information about the media data objects is carried in a text, binary, or extensible markup language (XML) format.

8. A media negotiation method for a multi-stream conference, the method comprising:
    receiving, by a second media entity, a media advertisement message sent by a first media entity, wherein the media advertisement message carries information about at least two media data objects, the information about the media data objects at least comprises information about one real-time site picture, the information about the real-time site picture at least comprises media view information, and the media data objects are media data streams that are provided by the first media entity for the second media entity;
    selecting, by the second media entity, from the information about the at least two media data objects, information about a media data object;
    sending, by the second media entity, a media selection message to the first media entity, wherein the media selection message carries the information, about the media data object, selected by the second media entity, so that the first media entity determines a corresponding media data object according to the information, about the media data object, selected by the second media entity; and
    establishing, by the second media entity, a media transmission channel with the first media entity, and receiving, through the media transmission channel, the corresponding media data object sent by the first media entity.

9. The method according to claim 8, wherein the media view information comprises:
coordinate range information of the real-time site picture; or
location content information of the real-time site picture; or
region division information of the real-time site picture in a particular scenario.

10. The method according to claim 8, wherein the information about the media data objects further comprises information about a presentation of shared content in a conference, and the information about the presentation comprises:
type information of the shared content.

11. The method according to claim 8, wherein the information about the media data objects further comprises at least one of the following:
language information;
role information;
priority information;
state variation information;
embedded text information;
supplementary description information;
telepresence identification information; and
coding and decoding format information.

12. The method according to claim 8, wherein before receiving, by the second media entity, the media advertisement message sent by the first media entity, the method further comprises:
sending, by the second media entity, a media capability message to the first media entity, wherein the media capability message carries media capability information that can be parsed by the second media entity, so that the first media entity determines the information about the at least two media data objects according to the media capability information that can be parsed by the second media entity.

13. A media negotiation device for a multi-stream conference, wherein the device is a first media entity, the device comprising:
a transceiver, configured to send a media advertisement message to a second media entity, wherein the media advertisement message carries information about at least two media data objects, the information about the media data objects at least includes information about one real-time site picture, the information about the real-time site picture at least includes media view information, and the media data objects are media data streams that are provided by the first media entity for the second media entity; and receive a media selection message sent by the second media entity, wherein the media selection message carries information, about a media data object, selected by the second media entity, and the information, about the media data object, selected by the second media entity is selected by the second media entity from the information about the at least two media data objects;
a processor, configured to determine a corresponding media data object according to the information, about the media data object, selected by the second media entity, and establish a media transmission channel with the second media entity, so as to transmit the corresponding media data object to the second media entity through the media transmission channel.

14. The device according to claim 13, wherein the media view information comprises:
coordinate range information of the real-time site picture; or
location content information of the real-time site picture; or
region division information of the real-time site picture in a particular scenario.

15. The device according to claim 13, wherein the information about the media data objects further comprises information about a presentation of shared content in a conference; and the information about the presentation comprises type information of the shared content.

16. The device according to claim 13, wherein the information about the media data objects further comprises at least one of the following:
language information;
role information;
priority information;
state variation information;
embedded text information;
supplementary description information;
telepresence identification information; and
coding and decoding format information.

17. The device according to claim 13, wherein the transceiver is further configured to receive a media capability message sent by the second media entity, wherein the media capability message carries media capability information that can be parsed by the second media entity, so that the first media entity determines the information about the at least two media data objects according to the media capability information that can be parsed by the second media entity.

18. The device according to claim 13, wherein the transceiver is further configured to receive a media advertisement message sent by the second media entity, wherein the media advertisement message sent by the second media entity is used to notify the first media entity of information about a media data object that can be provided by the second media entity; send a media selection message to the second media entity, so as to notify the second media entity of information, about a media data object, selected by the first media entity, wherein the information about the media data object selected by the first media entity is selected from the information about the media data object that can be provided by the second media entity, so that the second media entity transmits the media data object selected by the first media entity to the first media entity through the media transmission channel.

19. The device according to claim 13, wherein:
the media advertisement message and/or the media selection message is carried by one or a combination of several of the Session Initiation Protocol (SIP), the Session Description Protocol (SDP), the controlling multiple streams for telepresence (CLUE), and the H.323series protocols; or
the information about the media data objects carried in the media advertisement message is carried in a text, binary, or extensible markup language (XML) format.

20. A media negotiation device for a multi-stream conference, wherein the device is a second media entity, the device comprising:
a transceiver, configured to receive a media advertisement message sent by a first media entity, wherein the media advertisement message carries information about at least two media data objects, the information about the media data objects at least includes information about one real-time site picture, the information about the real-time site picture at least includes media view information, and the media data objects are media data streams that are provided by the first media entity for the second media entity;

a processor, configured to select, from the information about the at least two media data objects, information about a media data object;

the transceiver is further configured to send a media selection message to the first media entity, wherein the media selection message carries the information, about the media data object, selected by the second media entity, so that the first media entity determines a corresponding media data object according to the information, about the media data object, selected by the second media entity; and establish a media transmission channel with the first media entity, and receive, through the media transmission channel, the corresponding media data object sent by the first media entity.

21. The device according to claim 20, wherein the media view information comprises:
coordinate range information of the real-time site picture; or
location content information of the real-time site picture; or
region division information of the real-time site picture in a particular scenario.

22. The device according to claim 20, wherein the information, about the media data objects, carried in the media advertisement message further comprises information about a presentation of shared content in a conference, and the information about the presentation comprises type information of the shared content.

23. The device according to claim 20, wherein the information, about the media data objects, carried in the media advertisement message further comprises at least one of the following:
language information;
role information;
priority information;
state variation information;
embedded text information;
supplementary description information;
telepresence identification information; and
coding and decoding format information.

24. The device according to claim 20, wherein the transceiver is further configured to send a media capability message to the first media entity, wherein the media capability message carries media capability information that can be parsed by the second media entity, so that the first media entity determines the information about the at least two media data objects according to the media capability information that can be parsed by the second media entity.

* * * * *